(12) United States Patent
Edwards et al.

(10) Patent No.: US 7,564,421 B1
(45) Date of Patent: Jul. 21, 2009

(54) COMPACT WAVEGUIDE ANTENNA ARRAY AND FEED

(76) Inventors: Richard Gerald Edwards, 640 N. 2200 W., P.O. Box 16850, Salt Lake City, UT (US) 84116-0850; Rory Kim Sorensen, 640 N. 2200 W., P.O. Box 16850, Salt Lake City, UT (US) 84116-0850; Alan McLean Buchanan, 640 N. 2200 W., P.O. Box 16850, Salt Lake City, UT (US) 84116-0850

( * ) Notice: Subject to any disclaimer, the term of this patent is extended or adjusted under 35 U.S.C. 154(b) by 0 days.

(21) Appl. No.: 12/045,574

(22) Filed: Mar. 10, 2008

(51) Int. Cl.
*H01Q 13/00* (2006.01)

(52) U.S. Cl. .................. 343/776; 343/778; 333/137
(58) Field of Classification Search ............... 343/776, 343/772, 777, 778, 786; 333/137, 125
See application file for complete search history.

(56) References Cited

U.S. PATENT DOCUMENTS

| | | | |
|---|---|---|---|
| 4,126,835 A | | 11/1978 | Gould |
| 4,818,958 A | | 4/1989 | Lee et al. |
| 4,952,894 A | | 8/1990 | Connerney et al. |
| 5,243,357 A | * | 9/1993 | Koike et al. ............. 343/776 |
| 6,034,647 A | * | 3/2000 | Paul et al. ............... 343/776 |
| 6,075,494 A | | 6/2000 | Milroy |
| 6,563,398 B1 | | 5/2003 | Wu |
| 6,741,208 B1 | * | 5/2004 | West et al. ............. 342/374 |
| 6,897,824 B2 | * | 5/2005 | Gerhard ................. 343/776 |

OTHER PUBLICATIONS

Thomas Schm, Arto Lehto and Antti V Raisanen, "A Large Planar 39-GHz Antenna Array of Waveguide-Fed Horns," IEEE Transactions on Antennas and Propagation, vol. 46, No. 8, Aug. 1998, pp. 1189-1193.
Mahmoud Shahabadi, Dan Busuioc, Amir Borji and Safieddin Safavi-Naeini, "Low-Cost, High-Efficiency Quasi-Planar Arry of Waveguide-Fed Circularly Polarized Microstrip Antennas," IEEE Transactions on Antennas and Propagation, vol. 53, No. 6, Jun. 2005, pp. 2036-2043.
K Egashira, E Nishiyama, M. Aikawa, K. Yooshiki, and S. Egashira, "Planar Array Antenna Using Waveguide-Fed Sub Array," 2002 3rd International Conference on Microwave and Millimeter Wave Technology Proceedings, pp. 592-595.
Tetsuo Tsugawa, Masakatu Kawahara, Yoshibiko Sugio, and Yasuhiro Yamada, "Experimental Study of Dielectric Loaded Planar Antenna Fed by Waveguide Network," IEEE, 1994, pp. 480-483.

* cited by examiner

*Primary Examiner*—Hoang V Nguyen
(74) *Attorney, Agent, or Firm*—Kirton & McConkie; William T. Ralston (57) ABSTRACT

A compact waveguide antenna array feed system provides antenna element ports spaced along an array face by less than one free-space wavelength in at least one dimension, while retaining a thickness in a direction perpendicular to the array face of less than one and one-half free-space wavelength.

25 Claims, 8 Drawing Sheets

COMPACT WAVEGUIDE ANTENNA ARRAY AND FEED

FIELD OF THE INVENTION

The present invention relates generally to waveguide antenna feeds and array antennas.

BACKGROUND

Antennas provide for the radiation or reception of electromagnetic signals. An antenna may be characterized in terms of gain, beamwidth, or more specifically in terms of the antenna pattern which is a measure of the antenna gain as a function of direction. Simple antennas, such as dipoles or horns are well known, and find use in a number of applications. Simple antennas, however, are generally limited in terms of performance, providing limited gain/directivity and shaping of the radiation pattern.

Antenna arrays use a number of simple antenna elements to provide increased gain and directivity over what can be achieved using a single antenna element. In reception, signals from the individual elements are combined with appropriate phases and weighted amplitudes to provide the desired antenna pattern. Antenna arrays are also used in transmission, splitting signal power amongst the elements, again using appropriate phases and weighted amplitudes to provide the desired antenna pattern. Transmission lines or waveguides can be arranged to provide the desired phasing and combination/splitting of signals, and such an arrangement of transmission lines or waveguides is referred to as an antenna array feed.

At microwave frequencies, antenna feed design can be difficult when small element-to-element spacing relative to the wavelength is desired and potential for high losses. Microwave feed designs often use waveguide because of the lower loss provided. A waveguide feed typically includes a number of bends and twist sections to provide correct phasing to the elements of the array. These bends and twists take up large amounts of space, however, making waveguide feeds relatively bulky.

As a specific example, an antenna array can be constructed using horn antennas all facing in a common direction. The horn antennas are fed by a waveguide feed which includes a number of splitters and bends, for example in a corporate feed structure. The waveguide feed typically extends a large distance (i.e., many wavelengths) behind the antenna array. Typically waveguide feeds are designed for a specific array size (e.g., 1-by-8 array containing 8 radiating antenna elements), and as such, are not easily adapted to a larger array (e.g., 2-by-16 array containing 32 radiating elements) without significantly increasing the overall size and/or complexity of the feed network.

SUMMARY OF THE INVENTION

It has been recognized that it would be advantageous to develop a compact waveguide antenna array feed.

In one embodiment of the present invention, a compact antenna array feed includes a first signal port facing in a first direction and a plurality of antenna ports all facing in a second direction. The second direction is substantially orthogonal to the first direction. The antenna ports are arranged in an array and spaced from each other by less than one free-space wavelength in at least one direction. A waveguide corporate feed includes E-plane tees and H-plane bends to couple the signal port to the plurality of antenna ports. The waveguide corporate feed extends less than one and one-half free-space wavelength in a third direction substantially opposite to the second direction.

In another embodiment of the present invention, a compact antenna array feed includes a plurality of antenna ports arranged in an antenna array defining an array surface, wherein the antenna element ports are spaced less than one free-space wavelength in at least one dimension along the array surface. A waveguide corporate feed interfaces a signal port to the plurality of antenna element ports. The waveguide corporate feed includes a plurality of E-plane junctions and H-plane bends. The waveguide corporate feed extends less than one and one-half free-space wavelength in a direction perpendicular to the array surface.

Another embodiment of the present invention is a method of making a compact antenna array. The method can include fabricating an antenna element assembly having a plurality of antenna elements disposed along an antenna face. The antenna elements can be separated by less than one free-space wavelength in at least one direction along the antenna face. A feed network can be fabricated which provides a plurality of antenna ports corresponding to the antenna elements and having a waveguide corporate feed structure. The feed network can couple the plurality of antenna element ports to a signal port. The antenna element assembly and the feed network assembly can be joined to form the compact antenna array.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1A:
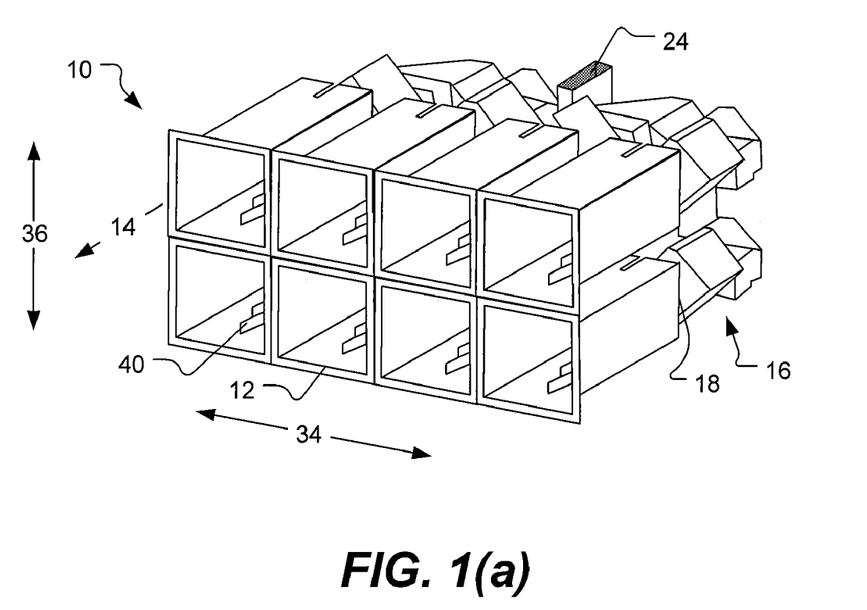
FIGS. 1(a) and 1(b) are respectively a front and back perspective view of an antenna array having a compact antenna feed in accordance with an embodiment of the present invention.
Figure 1B:
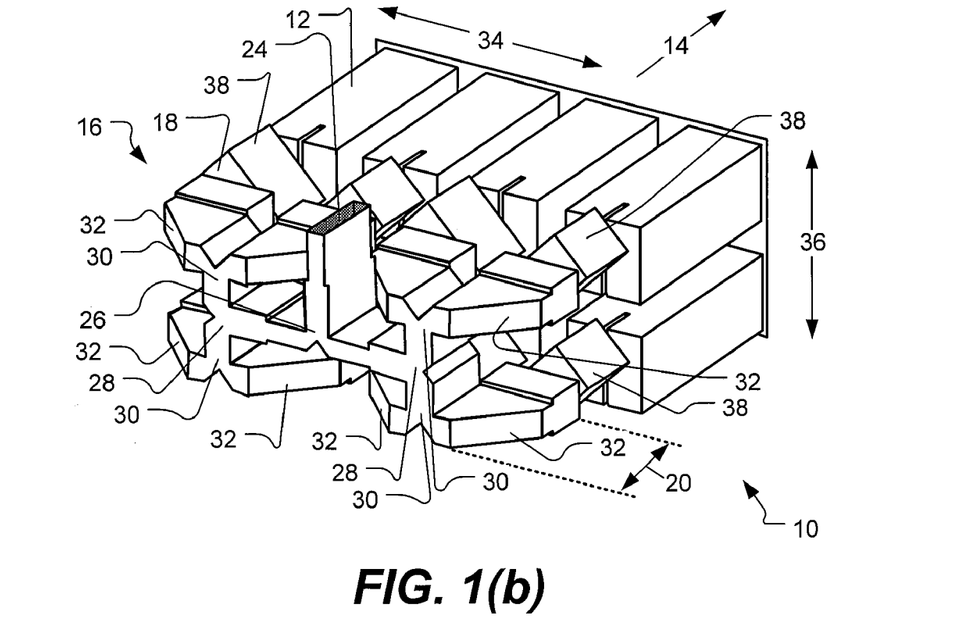

FIGS. 1(a) and 1(b) provide a perspective illustration of an antenna array in accordance with a first embodiment of the present invention. The antenna array, shown generally at 10, includes eight horn antenna elements 12. The horn antenna elements are arranged in a plane with the open faces facing in the radiation direction 14 and defining an array surface. The horn antenna elements can include a septum polarizer 40 to provide circular polarization.

The horn antenna elements 12 are fed by a compact waveguide corporate feed 16 coupled to the horn elements (via twist sections 38, explained further below) at antenna element ports 18 of the feed. The waveguide corporate feed has a thickness dimension 20, which extends approximately one free-space wavelength in a direction opposite the radiation direction 14. As will be explained further below, using the presently disclosed techniques, compact waveguide corporate feeds can be constructed with a thickness dimension that remains constant for virtually any number of radiating elements. The free-space wavelength is referenced to an operational frequency for which the antenna array is intended to operate. It will be appreciated that antennas may, however, be actually operated at frequencies that differ from the operational frequency, including frequencies which are significantly different than the operational frequency.

To provide this compact size, the waveguide corporate feed uses E-plane tees with integrated H-plane bends. The waveguide corporate feed includes a signal port 24, which is coupled to a primary E-plane tee 26, which in turn is coupled to two secondary E-plane tees 28 which are coupled to a set of four tertiary E-plane tees 30. Integrated into the tertiary E-plane tees are H-plane bends 32 to feed the antenna element ports 18.

By constructing the waveguide corporate feed 16 entirely from waveguide sections, losses are reduced as compared to a design incorporating two-conductor transmission lines (e.g., microstrip or coaxial cable). Furthermore, because the waveguide corporate feed uses only E-plane tees (rather than a combination of E-plane and H-plane tees), overall loss is reduced even further.

Because of the compact nature of the waveguide corporate feed 16, the antenna element ports 18, and hence the antenna elements 12, can be spaced apart by less than a free space wavelength. This provides a cleaner antenna pattern, as grating lobes are avoided. For example, the spacing in the azimuth direction 34 can be less than a free space wavelength, the spacing in the elevation direction 36 can be less than a free space wavelength, or the spacing in both directions can be less than a free space wavelength.

Figure 2:
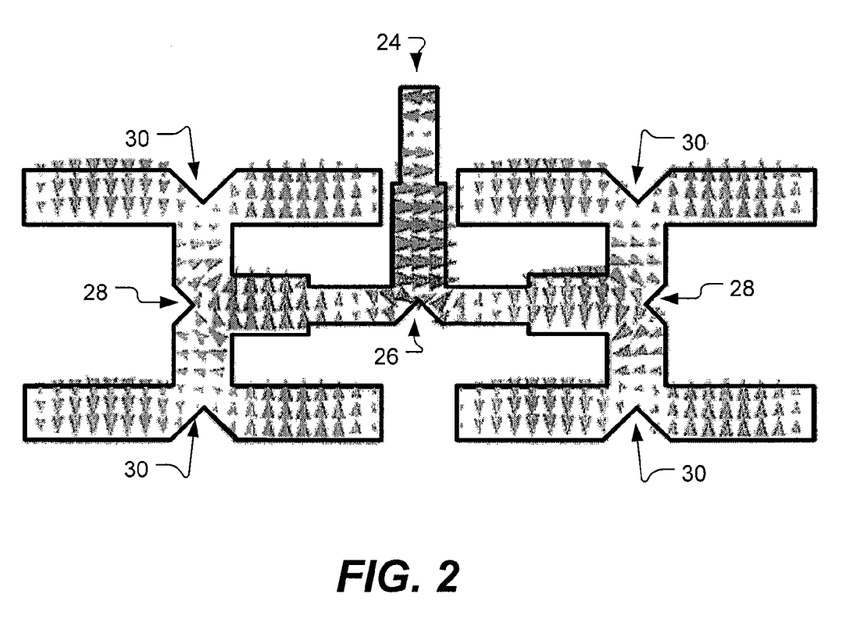
FIG. 2 is a diagram showing E-field orientation within a one-to-eight junction in accordance with an embodiment of the present invention.

Disposed between the waveguide corporate feed 16 and the horn antenna elements 12 are twist sections 38. For example, twist sections of length of about one-half wavelength are included, increasing the overall thickness of the entire feed system to about one and one-half wavelengths when the twist sections are included. The twist sections help to provide proper phase alignment at the antenna element ports 18. For example, FIG. 2 illustrates an E-field vector diagram of the feed showing the E-field directions through the tees 26, 28, 30 and at the inputs to the H-plane bends 32. It can be seen that a 180 degree phase shift exists between each of the arms of the tertiary E-plane tees 30. Accordingly, phase alignment at the horn antennas can be provided by including 90 degree twist sections 38 at the output of the H-plane bends, with the pair of twist sections on each tertiary tee 30 twisting in opposite directions.

As an alternative to twist sections 38, combinations of straight and ridged waveguide can be used to provide zero and 180 degree phase shifts. In such a case, since no rotation is provided between the waveguide corporate feed 16 and the antenna elements 12, the waveguide corporate feed may be rotated 90 degrees relative to the array elements.

Figure 3:
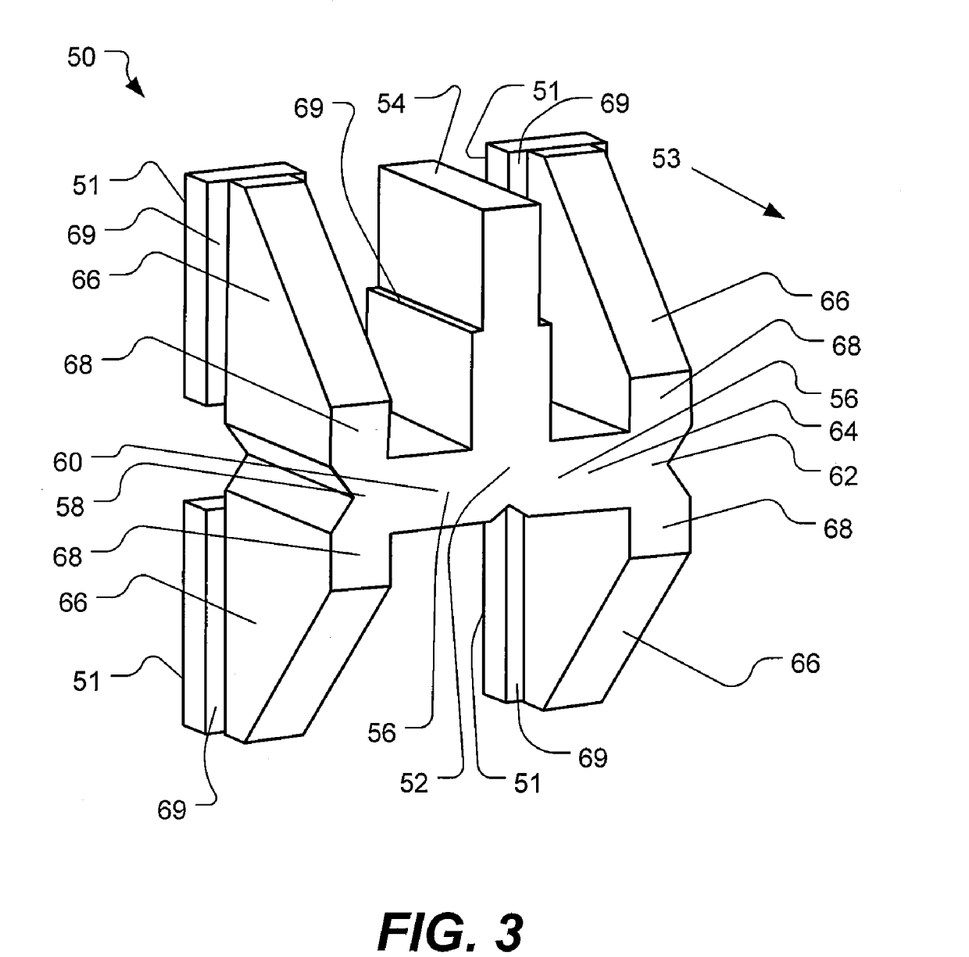
FIG. 3 is a perspective view of a one-to-four junction in accordance with an embodiment of the present invention.

The compact size of the antenna feed is enabled in part by the use of highly integrated E-plane tees and H-plane bends. The spacing between conventional E-plane tees is several wavelengths in length, in part to help avoid coupling between higher order waveguide modes, which can adversely impact frequency bandwidth and return loss. In contrast, a one-to-four junction that combines the functions of seven components (three tees and four bends) into a single integrated component has been designed and is shown in FIG. 3. The one-to-four junction 50 provides four antenna ports 51 separated by less than one free-space wavelength in all directions, yet extends less than one free-space wavelength behind 53 the four ports. This highly compact design not only provides significant space savings in the antenna feed, but also orients the main port at a right angle to the plane of the four branch ports, making it possible to connect multiple one-to-four junctions together using coplanar tees to provide a scaleable feed network that maintains the same relative thickness (depth) regardless of the size of the antenna array.

The one-to-four junction 50 includes a first E-plane tee 52 having a main port 54 and two arm ports 56. A second E-plane tee 58 has a main port 60 integrated into a first one of the two arm ports of the first E-plane tee. A third E-plane tee 62 has a main port 64 integrated into a second one of the two arm ports of the first E-plane tee. Four H-plane bends 66 are integrated into the arm ports 68 of the first E-plane tee and second E-plane tee. Integrating the tees and bends together helps to provide the compact size. The one-to-four junction may include steps 69 within the waveguide to help improve the VSWR/return loss, increase the frequency bandwidth, or both.

Because the tees and bends are very close together, there is significant coupling between the components, making optimization of the overall dimensions difficult. Optimization of the design for a specific frequency can be performed using computer aided design techniques. For example, the present design was optimized for operation at 14.875 GHz using both MiG WASP-Net and CST Microwave Studio to perform three-dimensional electromagnetic (EM) simulations. To obtain the final design, over 1000 iterations to optimize dimensions were automatically performed by the design tools. A model was parameterized so that physical dimensions were realizable (i.e., no negative dimensions). The independent parameters were used as optimization variables. Based on past experience, intuition and best design practices, these parameters were given initial conditions. Cost functions were written in order to maximize efficiency. This information was then fed into an optimizer to find a minimum of the cost function. As there is no way to guarantee that the solution found is a global minimum, the optimizer was restarted with new initial conditions in an effort to find a better solution, until acceptable results were obtained.

Figure 4A:
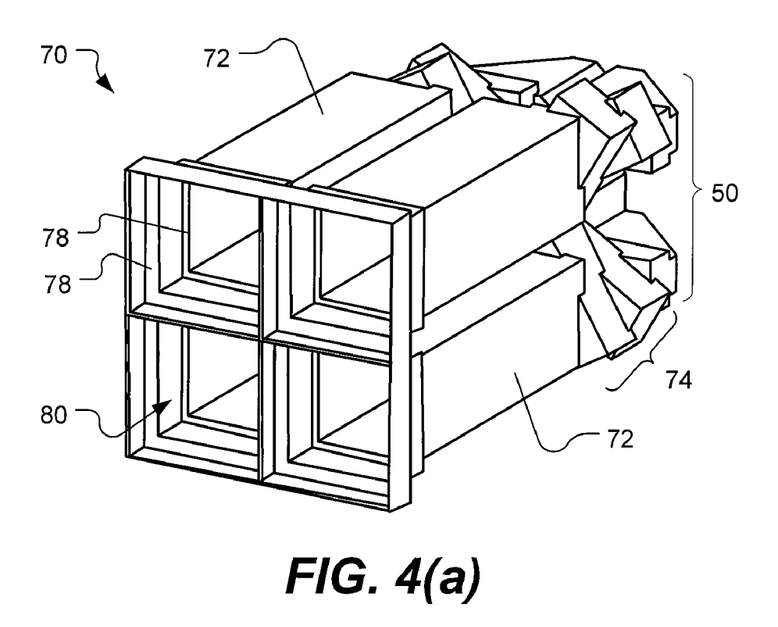
FIGS. 4(a) and 4(b) are respectively a front and back perspective view of an antenna array in accordance with another embodiment of the present invention.
Figure 4B:
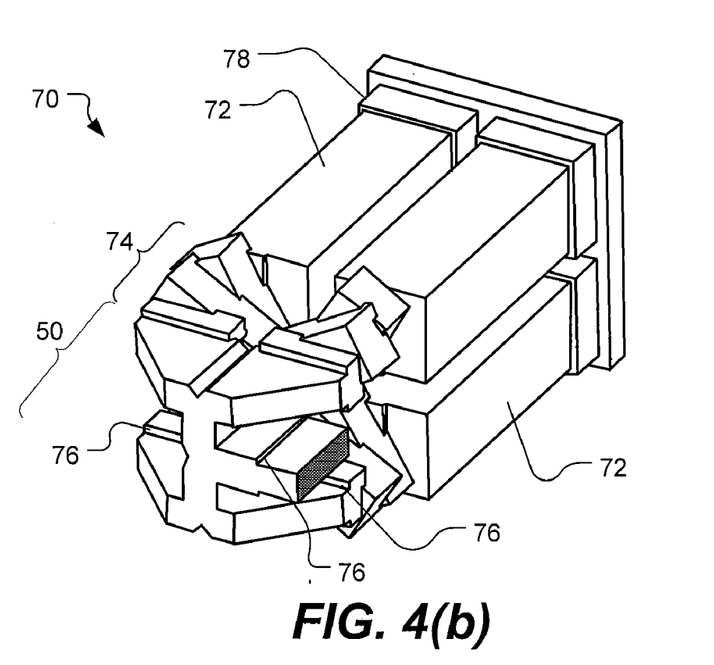

FIGS. 4(a) and 4(b) show the one-to-four junction 50 used as a feed for a small horn antenna array 70. The horn antennas 72 are coupled to the one-to-four junction through waveguide twist sections 74. The waveguide twist sections and one-to-four junction can include steps 76 to provide for increased frequency bandwidth. Steps 78 can also be included within the aperture 80 of the horn to provide increased bandwidth and a better impedance match to free space. Optimization of the locations of the steps within the one-to-four junction, waveguide twist sections, and horn apertures can be performed similarly as described above. If desired, double steps can be used to provide even greater frequency bandwidth.

Figure 5:
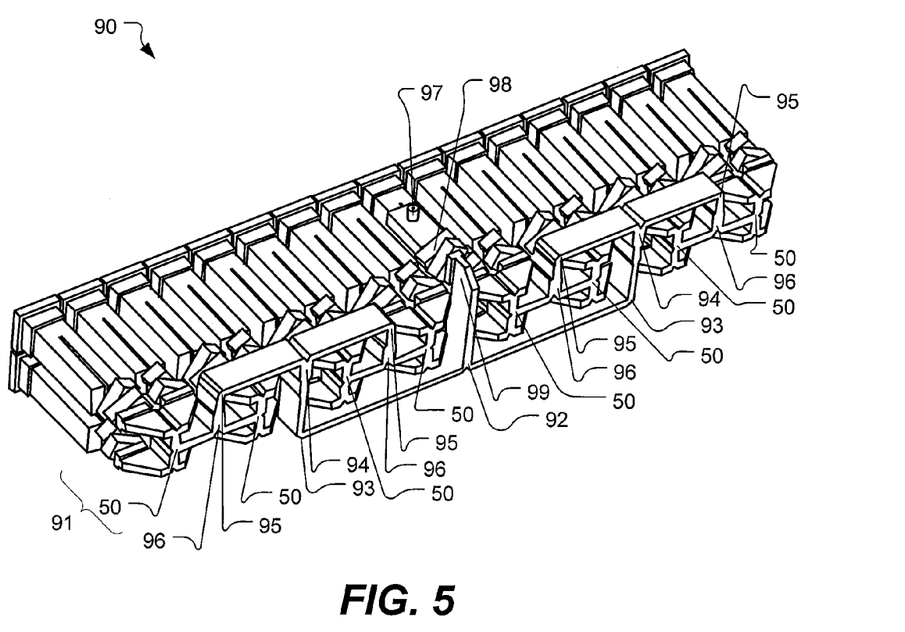
FIG. 5 is back perspective view of an antenna array with another embodiment of the present invention

Using the one-to-four junction as a building block, a compact feed can be expanded or scaled for larger size arrays. For example, the basic one-to-four junction can feed a set of four antenna elements. Arrays having 4, 8, 16, 32, etc antenna elements can easily be formed by combining multiple one-to-four junctions using additional E-plane tees. For example, FIG. 5 illustrates a 32-element array 90 having a compact feed 91 built using eight of the one-to-four junctions 50. The feed includes a tree-like arrangement of coplanar E-plane tees, including a primary tee 92, two secondary tees 94, and four tertiary tees 96 to provide one-to-eight splitting/combining between the main feed port 97 and the one-to-four junctions. The feed also contains multiple E-plane bends, including two primary bends 93 and four secondary bends 95. The one-to-four junctions are oriented to allow connection to the arms of the tertiary tees, and provide an additional four-way split/combine, such that all 32 antenna elements are fed with equal amplitude and phase (assuming the inclusion of the twist sections).

Also shown in FIG. 5 is a "scorpion tail" that includes an H-plane bend 99 and twist section 98 to bring the waveguide towards the front of the feed and feed a coaxial transition providing the main feed port 97 of the feed 91. This provides a more convenient positioning of the main feed port in some applications. For example, in one embodiment, this places the main feed port close to the center of gravity of the antenna 90, which, in turn, ensures proximity to an RF rotary joint in an antenna pedestal, thus reducing feed losses through the antenna pedestal.

Figure 6:
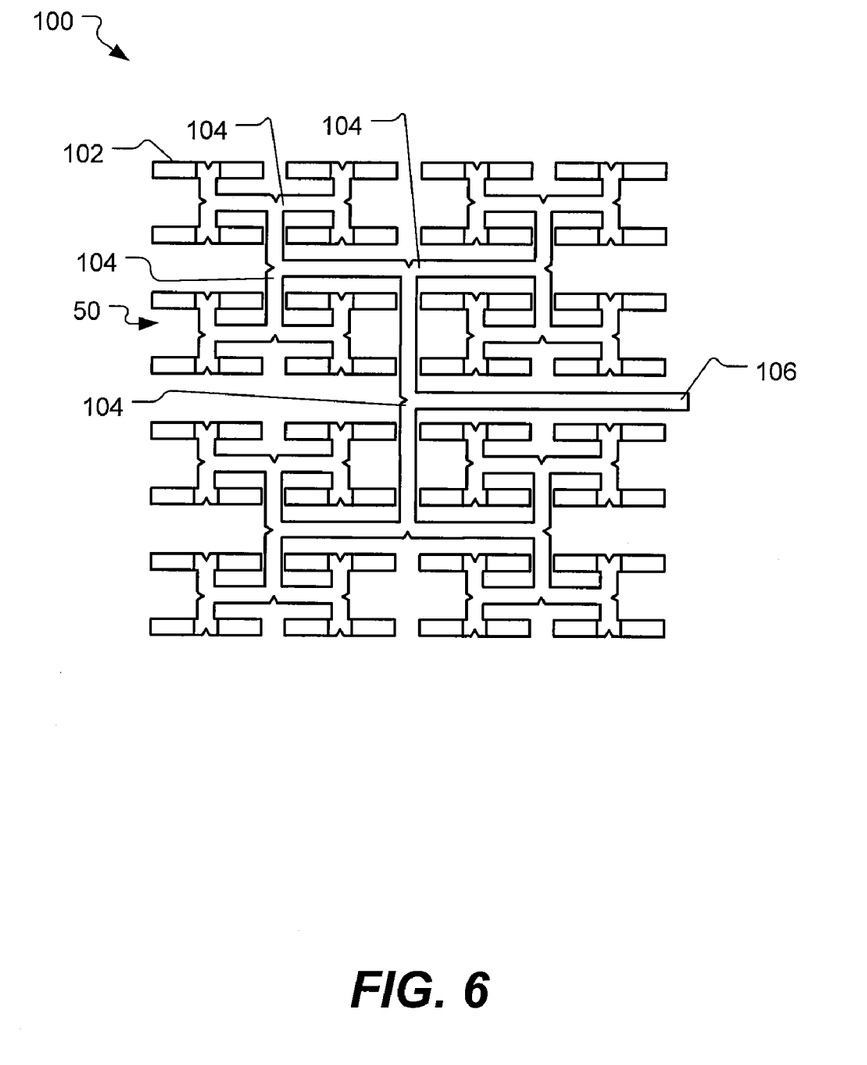
FIG. 6 is a block diagram of an antenna feed array in accordance with an embodiment of the present invention.

Larger antenna arrays can, of course, be constructed using additional E-plane tees. For example, FIG. 6 illustrates a rear view block diagram of a rectangular antenna array feed 100 having sixty-four ports 102 using similar principles. The rectangular array uses a plurality of the one-to-four junctions 50 as described above, intercoupled by a plurality of E-plane tees 104 to the array feed 106. It can be seen that using the compact feed structure, additional increases in array size can be easily accommodated by adding additional E-plane tees, without increasing the thickness of the compact feed network, since all of the E-plane tees are coplanar. Inter-element spacing can be maintained at less than one free-space wavelength (e.g., about 0.9 wavelengths), while the thickness of the feed (not including the twist sections) is roughly the H-plane width of the waveguide (e.g., less than one free-space wavelength).

More generally, arrays having sizes of 4*N, wherein N is a positive integer, can be formed by using a combination of 2-way and/or 3-way E-plane junctions and other higher-order E-plane junctions (e.g., 5-way) as well. For example, a 12 element array can be formed using three of the one-to-four junctions and a one-to-three E-plane splitter/combiner. Arrays of size 4, 8, 16, 32, or in general $4*2^N$, wherein N is a positive integer, can be formed using two-way E-plane tees. In all of these cases, the thickness of the compact feed network may remain the same, regardless of the size of the array. This is of great advantage over conventional feed networks which typically become increasingly large in multiple dimensions as array size is scaled.

Figure 7:
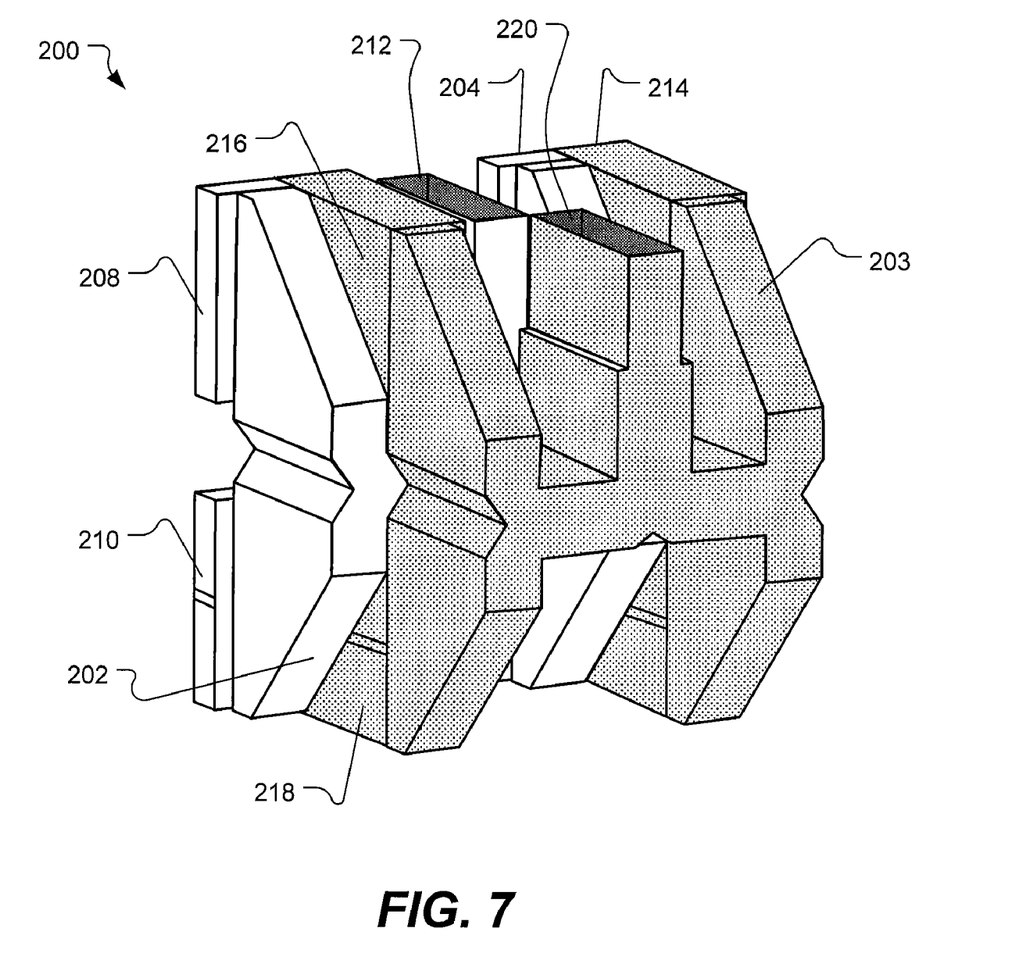
FIG. 7 is a perspective view of a dual antenna array feed providing dual polarization in accordance with an embodiment of the present invention.

FIG. 7 illustrates a dual polarization compact feed 200, capable of both left-hand circular polarization and right-hand circular polarization operation. A first compact feed network 202 is coupled to first sides 204 of septum polarizer horns (not shown) via straight waveguide 208 and straight ridged waveguide 210 sections to provide 180 degree phasing correction. The first compact feed network includes integrated E-plane tee and H-plane bends as described above and a first signal feed port 212. A second compact feed network 203 (shown with shading) is offset from the first compact feed network and is coupled to second sides 214 of the septum polarizers via straight waveguide 216 and ridged waveguide 218 sections. The second compact feed network provides a second signal feed port 220. The second compact feed network is similar to the first compact feed network, except that the phasing correction sections are slightly longer to place the second compact feed network in position behind the first compact feed network. Depending on which signal feed port 212, 220 is used, left-hand or right-hand circular polarization can be generated.

While various feed designs have been illustrated above using rectangular waveguide, the same principles outlined above for the design of the compact waveguide antenna feed can be applied to a design using circular or elliptical waveguides.

Figure 8:
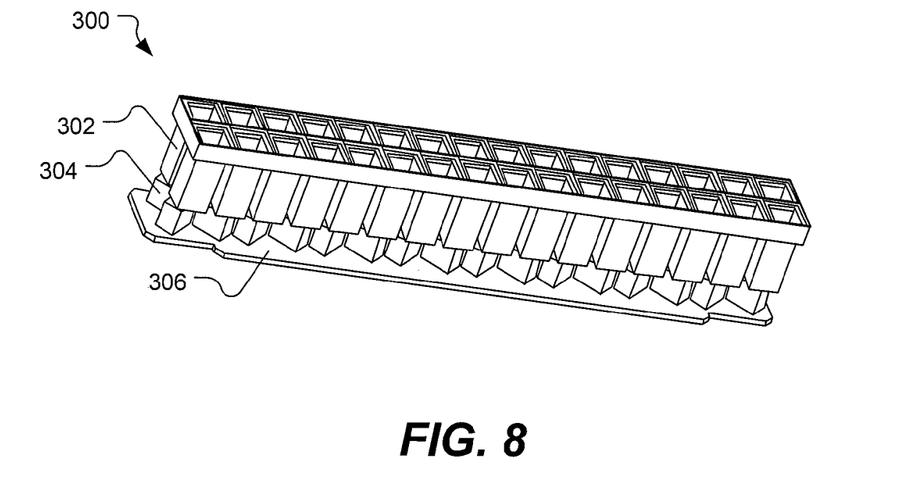
FIG. 8 is a perspective view of the antenna element assembly portion of FIG. 5 in accordance with an embodiment of the present invention.

Finally, a method for fabricating a compact antenna array is described. The method may include fabricating an antenna element assembly having a plurality of antenna elements disposed along an antenna face. The antenna elements are separated by less than one free-space wavelength in at least one direction along the antenna face. For example, the antenna elements may be fabricated by casting, stamping, electroforming, stereo lithography (SLA), or otherwise forming a conductive material into the shape of the antenna elements. If desired, the antenna elements may include twist or straight/ridged waveguide sections to provide phase rotation. For example, FIG. 8 illustrates an antenna element assembly 300 corresponding to the antenna element portion of FIG. 5. The antenna element assembly includes a septum-polarizer horn section 302 and a waveguide twist section 304. A flange 306 disposed at the feed end of the waveguide twist section allows assembly with a corresponding compact waveguide feed network.

The method can also include fabricating a feed network assembly having a plurality of antenna element ports corresponding to the antenna elements. The feed network assembly includes a waveguide corporate feed structure to couple the plurality of antenna element ports to a signal port. The overall thickness of the feed network assembly can be less than one free-space wavelength in a direction perpendicular to the antenna face (or less than 1.5 free-space wavelengths if integrated twist sections are included). For example, the feed network assembly can be fabricated by casting, stamping, electroforming, stereo lithography (SLA), or otherwise forming a conductive material into the shape of the feed network assembly.

As a specific example, a solid is formed in the shape of an interior portion of the corporate waveguide feed structure, and is then plated with a conductive material to form an outer surface of the waveguide corporate feed structure. If desired, the solid may be dissolved to expose the interior portion of the waveguide corporate feed structure, or the solid may be left in place as a dielectric material.

Another example involves utilizing the stereo lithography apparatus/assembly (SLA) process to fabricate the antenna array structure (both the antenna element assembly and the feed network assembly). The SLA parts are constructed layer by layer using a ceramic-filled epoxy material, which hardens when exposed to UV light. The final SLA parts are then plated with noble metals (e.g., silver) to metalize the parts for good RF performance.

Figure 9:
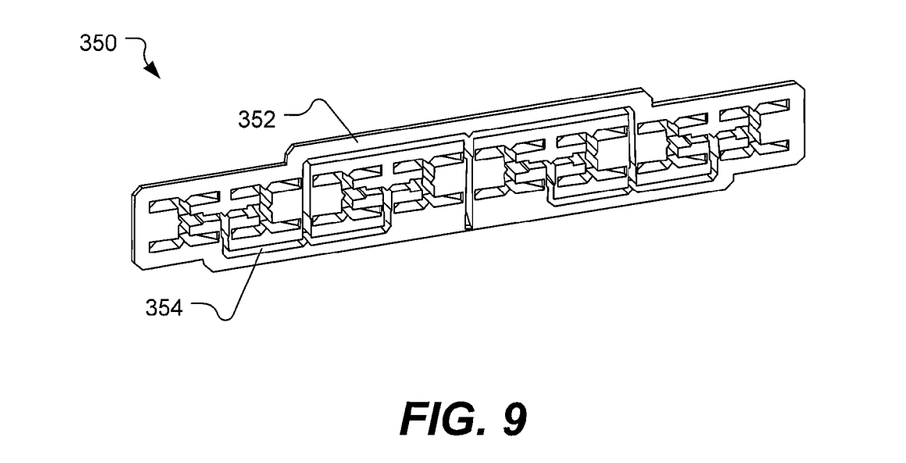
FIG. 9 is a perspective view of the feed network assembly portion of FIG. 5 in accordance with an embodiment of the present invention.

For example, FIG. 9 illustrates a feed network assembly 350 corresponding to the feed network portion of FIG. 5. The feed network assembly includes a mating surface 352 that mirrors the flange 306 of the antenna element assembly 300. Waveguide portions 354 corresponding to the H-plane bends and E-plane junctions of the feed are included in the mating surface.

The compact antenna array is completed by joining the antenna element assembly and the feed network assembly together. For example, the flange 306 of the antenna element assembly 300 may be attached to the mating surface 352 of the feed network assembly 350. The surfaces may be bonded together with a conductive glue or epoxy. As another example, brazing or welding may be performed.

The conductive material used to form the compact antenna array may be, for example copper or silver. Alternately, low-loss conductive materials (e.g., copper or silver) may be coated onto a structure formed of other materials (e.g., aluminum, SLA material). If desired, passivation (e.g., anodizing or gold plating) of the conductive material may be performed.

Summarizing and reiterating to some extent, the disclosed antenna array feed techniques provide a very compact, yet scalable antenna feed architecture. The one-to-four junction building block tightly integrates junctions and bends to provide a convenient arrangement of ports. Multiple one-to-four junctions can be ganged together using conventional E-plane tees to provide a wide range of array sizes. While illustrated primarily using horn antennas and rectangular waveguide, the same basic approach can be applied to other waveguide types and antenna configurations. The foregoing examples are necessarily limited in complexity in the interest of brevity. Alternate arrangements of a compact antenna array feed similar to the above examples will occur to one of skill in the art.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A compact waveguide antenna array feed system for operation at a free-space wavelength comprising:
    a first signal port facing in a first direction;
    a plurality of antenna element ports all facing in a second direction substantially orthogonal to the first direction, the antenna element ports being arranged in an array and spaced from each other by less than one free-space wavelength in at least one dimension; and
    a waveguide corporate feed comprising E-plane tees and H-plane bends coupling the signal port to the plurality of antenna element ports, the corporate feed extending less than one and one-half free-space wavelength in a third direction substantially opposite to the second direction.

2. The system of claim 1, wherein the antenna element ports are spaced less than one free-space wavelength in at least two dimensions of the array surface.

3. The system of claim 2, wherein the two dimensions correspond respectively to an azimuth plane and an elevation plane.

4. The system of claim 1, further comprising a plurality of antenna elements coupled to corresponding antenna element ports to form an antenna array.

5. The system of claim 4, further comprising a plurality of phase shifter segments interposed between each of the plurality of antenna element ports and corresponding ones of the plurality of antenna elements.

6. The system of claim 4, wherein each antenna element comprises a horn.

7. The system of claim 4, further comprising a plurality of septum polarizers disposed within the antenna elements.

8. The system of claim 1, further comprising a plurality of phase shifter segments coupled to the antenna element ports.

9. The system of claim 8, wherein the phase shifter segments comprise waveguide twist sections.

10. The system of claim 8, wherein the phase shifter segments comprise ridged waveguide sections.

11. The system of claim 1, wherein the waveguide corporate feed comprises integrated E-plane tee and H-plane bends.

12. The system of claim 1, wherein the waveguide corporate feed comprises a one-to-four junction, the one-to-four junction comprising:
    a first E-plane tee having a main port and two arm ports;
    a second E-plane tee having a main port integrated into a first one of the two arm ports of the first E-plane tee and having two arm ports;
    a third E-plane tee having a main port integrated into a second one of the two arm ports of the first E-plane tee and having two arm ports;
    four H-plane bends integrated into the arm ports of the second E-plane tee and the third E-plane tee, the four H-plane bends providing four ports disposed within a common plane and separated by less than one free-space wavelength in all directions.

13. The system of claim 1, wherein the waveguide corporate feed comprises a rectangular waveguide.

14. A compact antenna array feed system for operation at a free-space wavelength comprising:
    a plurality of antenna element ports arranged in an antenna array defining an array surface, wherein the antenna element ports are spaced less than one free-space wavelength in at least one dimension of the array surface;
    a signal feed port; and
    a waveguide corporate feed interfacing the signal feed port to the plurality of antenna element ports, the waveguide corporate feed comprising a plurality of E-plane tees and H-plane bends, the waveguide corporate feed extending less than one and one half free-space wavelength in a direction perpendicular to the array surface.

15. The system of claim 14, wherein the antenna element ports are spaced less than one free-space wavelength in at least two dimensions of the array surface, the two dimensions corresponding respectively to an azimuth plane and an elevation plane.

16. The system of claim 14, further comprising a plurality of antenna elements coupled to corresponding antenna element ports to form an antenna array.

17. The system of claim 16, further comprising a plurality of septum polarizers disposed within the antenna elements.

18. The system of claim 14, further comprising a plurality of phase shifter segments coupled to the antenna element ports.

19. The system of claim 14, wherein the waveguide corporate feed comprises an integrated E-plane tee/H-plane bend element, the integrated E-plane tee/H-plane bend element comprising:
    a first E-plane tee having a main port and two arm ports;
    a second E-plane tee having a main port integrated into a first one of the two arm ports of the first E-plane tee and having two arm ports;
    a third E-plane tee having a main port integrated into a second one of the two arm ports of the first E-plane tee and having two arm ports;

four H-plane bends integrated into the arm ports of the second E-plane tee and the third E-plane tee, the four H-plane bends providing four ports disposed within a common plane and separated by less than one free-space wavelength in all directions.

20. A dual polarization array antenna feed comprising:

a first compact antenna array feed system and a second compact antenna array feed system, each as in claim 14; and a plurality of antenna elements each having a septum polarizer, the antenna elements having first ports coupled to the antenna element ports of the first compact antenna array feed system, and having second ports coupled to the second compact antenna array feed system.

21. A method of making a compact antenna array capable of operation at a free-space wavelength comprising:

fabricating an antenna element assembly having a plurality of antenna elements disposed along an antenna face, separated by less than one free-space wavelength in at least one direction along the antenna face;

fabricating a feed network assembly having a plurality of antenna element ports corresponding to the antenna elements and having a waveguide corporate feed structure to couple the plurality of antenna element ports to a signal port, the waveguide corporate feed structure extending less than one and one-half free-space wavelength in a direction perpendicular to the antenna face; and joining the antenna element assembly and the feed network assembly to form the compact antenna array.

22. The method of claim 21, wherein fabricating the feed network assembly comprises:

forming a solid in the shape of the waveguide corporate feed structure using a stereo lithographic process; and plating the solid with a low-loss conductive material.

23. The method of claim 21, wherein fabricating the feed network assembly comprises:

forming a solid in the shape of an interior portion of the waveguide corporate feed structure using a stereo lithographic process; and plating the solid with a conductive material to form an outer surface of the waveguide corporate feed.

24. The method of claim 23, further comprising dissolving the solid to expose the interior portion of the waveguide corporate feed structure.

25. The method of claim 23, wherein the solid is formed of a dielectric material.

\* \* \* \* \*